(12) United States Patent
Yamaguchi

(10) Patent No.: US 6,888,655 B2
(45) Date of Patent: May 3, 2005

(54) OPTICAL BEAM SCANNING DEVICE

(75) Inventor: Masao Yamaguchi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/879,999

(22) Filed: Jun. 30, 2004

(65) Prior Publication Data

US 2005/0002076 A1 Jan. 6, 2005

(30) Foreign Application Priority Data

Jul. 3, 2003 (JP) ........................................ 2003-191141

(51) Int. Cl.[7] .............................................. G02B 26/08
(52) U.S. Cl. ...................... 359/216; 359/205; 359/207
(58) Field of Search ................................ 359/205–208, 359/216–219; 347/243, 260–261

(56) References Cited

U.S. PATENT DOCUMENTS

| | | | |
|---|---|---|---|
| 4,714,960 A | * 12/1987 | Laakmann | ................... 348/203 |
| 5,793,515 A | 8/1998 | Sekikawa | |
| 5,930,019 A | * 7/1999 | Suzuki et al. | ................ 359/204 |
| 6,667,757 B1 | 12/2003 | Yamaguchi et al. | |

FOREIGN PATENT DOCUMENTS

| | | |
|---|---|---|
| JP | 8-171069 A | 7/1996 |
| JP | 11-149055 A | 6/1999 |

OTHER PUBLICATIONS

U.S. Appl. No. 10/424,834, filed Apr. 29, 2003, Yamaguchi.
U.S. Appl. No. 10/401,879, filed Mar. 31, 2003, Yamaguchi.

* cited by examiner

*Primary Examiner*—James Phan
(74) *Attorney, Agent, or Firm*—Foley & Lardner LLP (57) ABSTRACT

An optical beam scanning device comprises optical beam scanning means for rotational polygonal mirror to deflect entering luminous flux and scan an object to be scanned with the luminous flux; pre-deflection optical system which shapes a luminous flux emitted from light source means to image the resultant luminous flux onto the optical beam scanning means; and imaging optical system which images the luminous flux from the optical beam scanning means onto the object to be scanned. In the optical beam scanning device, the imaging optical system comprises an imaging optical element that in the entire main scanning area for luminous flux from the optical beam scanning means, the central scanning position has a main scanning direction curvature different from that of the scanning position of the scanning end, and a scanning angle $\alpha 0$ [rad] at which the optical beam scanning means scans the object to be scanned with the luminous flux is defined by the following expression, $$\alpha 0 \leq \pi\{(2/N)-(Vr/3)\times 10^{-7}\}$$

wherein N indicates the number of surfaces of the rotational polygonal mirror and Vr [r.p.m.] indicates the revolution of the rotational polygonal mirror.

16 Claims, 10 Drawing Sheets

FIG.11 a : PRESENT INVENTION,
b : CONVENTIONAL EXAMPLE

FIG.12 a : PRESENT INVENTION,
b : CONVENTIONAL EXAMPLE

FIG.13 a : PRESENT INVENTION,
b : CONVENTIONAL EXAMPLE

OPTICAL BEAM SCANNING DEVICE

BACKGROUND OF THE INVENTION

The present invention relates to an optical beam scanning device which is used for laser printers and digital copying machines.

The optical beam scanning device comprises a pre-deflection optical system, an optical beam scanning device and an imaging optical system.

The pre-deflection optical system has a polarity of lenses for directing a light beam emitted from a light source device (e.g., laser diode) to the optical beam scanning device and an opening portion with a predetermined shape of opening. The pre-deflection optical system adjusts the cross-sectional configuration of the light beam from the light source device to a predetermined one and guides the resultant beam toward a predetermined position on the optical beam scanning device.

The optical beam scanning device has a polygon mirror with a plurality of reflecting surfaces (mirror surfaces). The optical beam scanning device successively deflects the light beam from the pre-deflection optical system with its configuration having been adjusted to the predetermined one while continuously rotating its reflecting surfaces in order to generate a light beam which is to be guided from one end to the other end of an image surface (so-called photosensitive body) in its width direction along its rotating direction (main scanning direction). Accordingly, light beams illuminated onto the reflecting surfaces of the polygon mirror have their reflecting angles changed successively by the reflecting surfaces of the polygon mirror being rotated and then reflected (deflected) in the main scanning direction.

The imaging optical system scans substantially linearly and images, in a direction along its axial direction, the light beam successively reflected by the reflecting surfaces of the polygon mirror on a predetermined position of the image.

An imaging lens (generally referred to as an fθ lens) is used for the imaging optical system. The imaging lens converges the light beams reflected by the reflecting bodies of the polygon mirror onto a focal position on the image surface and makes diameters of the light beams, reflected by the reflecting surfaces of the polygon mirror, uniform.

Further, the imaging optical system controls so that the speed of light beam which is reflected from the reflecting surfaces of the polygon mirror and which is to be scanned on the image surface is constant over the entire scanning area.

Patent Reference 1 (Japanese Patent Application Laid-Open (JP-A) No. 8-171069) and Patent Reference 2 (JP-A No. 11-149055) disclose conventional optical beam scanning devices.

Patent Reference 1 discloses the arrangement in which a first imaging lens with negative power is provided next to a polygon mirror in an imaging optical system for an optical beam scanning device, and positive power at a scanning end position finally becomes larger than that at a scanning central position by combination of a plurality of imaging lenses.

Patent Reference 2 discloses the arrangement formed of a single imaging lens with positive power.

In general, the scanning position on the image surface in the main scanning direction is substantially in the linear relationship with a scanning angle determined by the reflecting surfaces of the polygon mirror. Accordingly, as the scanning angle is increased, the scanning position is shifted from the central position.

If the imaging lens is not placed in the imaging optical system, as the scanning angle is increased, the scanning position is shifted greatly from its target position (ideal position). Conventional devices do not compensate for this shift perfectly.

According to conventional examples, the main scanning direction diameter of beam scanned on the image surface varies depending on its scanning position.

An overfilled type optical beam scanning device solves the aforementioned drawbacks by increasing the number of reflecting surfaces for a polygon mirror and decreasing an available scanning angle. Nevertheless, when a scanning area with a certain size is to be obtained, an optical path length is increased. This results in a large scale of structure and an increased number of folded mirrors mounted in an optical beam scanning device. As a result, costs are increased.

The above-described Patent References 1 and 2 disclose techniques for solving such problems. Nevertheless, the optical beam scanning device of Patent Reference 1 has a plurality of imaging lenses and thus the problem about an increased number of lenses may arise.

The optical beam scanning device of Patent Reference 2 includes a single imaging lens. Nevertheless, the scanning angle is increased and the time for non-emission area from the end position of a scanning line to the start position of the next scanning line in the main scanning direction is reduced. As a result, it is difficult to ensure control time for APC (Auto Power Control) in a light source device.

SUMMARY OF THE INVENTION

The present invention provides an optical beam scanning device which is capable of reducing variations in a main scanning direction beam diameter depending on scanning positions and which enables high image quality while ensuring control time for APC in a light source device.

An optical beam scanning device of the present invention comprises optical beam scanning means for rotational polygonal mirror to deflect entering luminous flux and scan an object to be scanned with the luminous flux; pre-deflection optical system which shapes a luminous flux emitted from light source means so that the optical beam scanning means images the resultant luminous flux as a long line image in a direction corresponding to a main scanning direction; and imaging optical system which images the luminous flux scanned by the optical beam scanning means onto the object to be scanned. In the optical beam scanning device, the imaging optical system comprises an imaging optical element that in the entire main scanning area for luminous flux to be scanned by the optical beam scanning means, the central scanning position has a main scanning direction curvature different from that of the scanning end, and a scanning angle α0 [rad] at which the optical beam scanning means scans the object to be scanned with the luminous flux is defined by the following expression, $$\alpha 0 \leq \pi\{(2/N)-(Vr/3)\times 10^{-7}\}$$

wherein N indicates the number of surfaces of the rotational polygonal mirror and Vr [r.p.m.] indicates the revolution of the rotational polygonal mirror.

DESCRIPTION OF THE PREFERRED EMBODIMENTS

(A) First Embodiment

Preferred embodiments of the optical beam scanning device of the present invention will be described hereinafter with reference to the drawings.

Figure 1:
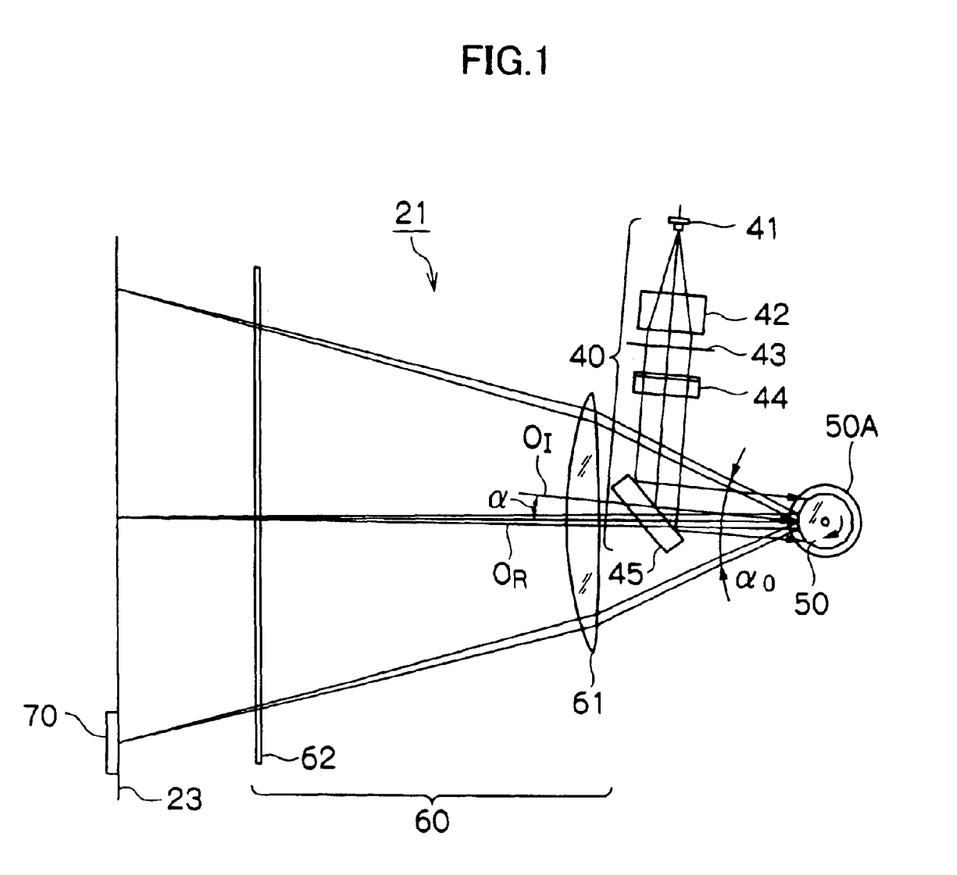
FIG. 1 is a schematic plan view illustrating the structure of an optical beam scanning device 21 seen from a main scanning direction.

FIG. 1 shows a schematic plan view in which optical elements arranged between a light source (semiconductor laser element) 41 and a photosensitive drum (object to be scanned) 23 that are included in an optical beam scanning device 21 are seen from a main scanning direction and a folded state by folding mirrors is developed.

Figure 2:
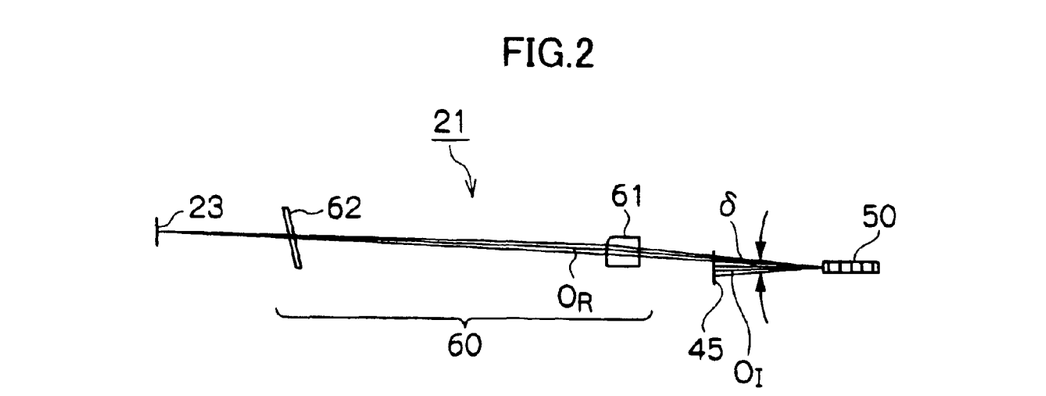
FIG. 2 is a schematic plan view of the optical beam scanning device 21 seen from a cross-scanning direction.

FIG. 2 shows a schematic cross-sectional view in which a cross-scanning direction perpendicular to the main scanning direction illustrated in FIG. 1 is depicted as a plane.

Referring to FIGS. 1 and 2, the optical beam scanning device 21 has a pre-deflection optical system 40, a polygon mirror 50 and an imaging optical system 60.

The pre-deflection optical system 40 has a semiconductor laser element (light source) 41, a luminous flux converting lens 42, an aperture 43, a cylindrical lens 44 and a mirror 45. The semiconductor laser element 41 emits, for example, 780 nm of laser beam (lightbeam). The luminous flux converting lens 42 is formed of a finite focus lens for converting the laser beam emitted from the semiconductor laser element 41 into converging light, a collimator lens for converting the laser beam into substantial parallel light (or diverging light) or a lens for converting the laser beam into diverging light. The aperture 43 restricts the quantity of laser beam (width of luminous flux) which have passed through the luminous flux converting lens 42 to a predetermined quantity. The cylindrical lens 44 has predetermined power (refractive power) only in the cross-scanning direction in order to adjust the cross-sectional configuration of the laser beam whose quantity has been restricted by the aperture 43 to a predetermined cross-sectional beam configuration. The mirror 45 bends the laser beam which has passed through the cylindrical lens 44 in a predetermined direction (direction to the polygon mirror 50).

Although the wavelength of laser beam emitted from the semiconductor laser element 41 is 780 nm in this embodiment, for example, 650 nm or 630 m of the wavelength, or shorter wavelengths (for example, wavelengths of 370 nm to 445 nm) may be used. Shorter wavelengths enable smaller beam diameters on the photosensitive drum 23.

The polygon mirror 50 is provided in the direction that the laser beam, with its predetermined cross-sectional beam configuration has been determined by the pre-deflection optical system 40, proceeds. The polygon mirror 50 is integrally formed with a polygon mirror motor 50A which is rotated at a predetermined speed and scans the laser beam from the pre-deflection optical system 40 toward the photosensitive drum 23 which is placed subsequent to the polygon mirror 50.

The imaging optical system 60 is provided between the polygon mirror 50 and the photo sensitive drum 23. The imaging optical system 60 successively images laser beams reflected by reflecting surfaces of the polygon mirror 50 in a substantially linear manner along the axial direction of the photosensitive drum 23.

The imaging optical system 60 has an imaging lens (generally referred to as an fθ lens) 61 and a dust-proof glass 62. The imaging lens 61 illuminates the laser beams successively reflected by the reflecting surfaces of the polygon mirror 50 from one end to another end of the photosensitive drum 23 in its longitudinal (axial) direction such that a position of laser beam on the photosensitive drum 23 when illuminated thereon is in proportion to a rotating angle of the reflecting surface of the polygon mirror 50. Further, the imaging lens 61 provides a focusing property to which a predetermined relationship is applied on the basis of an angle by which the polygon mirror 50 is rotated so that a predetermined cross-sectional beam diameter is obtained from any longitudinal direction position on the photosensitive drum 23. The dust-proof glass 62 prevents toners, dusts or paper dusts from entering an unillustrated housing in the optical beam scanning device 21.

The luminous flux which has been deflected by the reflecting surfaces of the polygon mirror 50 is scanned onto the photosensitive drum 23 through the imaging lens 61 and the dust-proof glass 62. Rotation of the polygon mirror 50 in the direction indicated by the arrow in FIG. 1 scans the surface of the photosensitive drum with the luminous flux in the main scanning direction and thus recording is performed.

A horizontal synchronizing sensor 70 controls, for laser beams scanned on the photosensitive drum, their start positions in the main scanning direction. Further, the horizontal synchronizing sensor 70 also performs feedback control for intervals between beams in the cross-scanning direction in which when a plurality of beams are scanned, after scanning of one line in the main scanning direction, the interval between the current line and the next line is controlled.

An optical path for laser beam from the semiconductor laser element 41 to the photosensitive drum 23 in the optical beam scanning device 21 is appropriately bent by an or a plurality of unillustrated mirrors in an unillustrated housing of the optical beam scanning device 21. Such mirrors only for bending the optical path are provided at positions that do not affect characteristic portions of the optical path to be described later in this embodiment.

The optical beam scanning device 21 illustrated in FIG. 1 is applied when beams enter the polygon mirror 50 from the inside of scanning area.

As illustrated in FIG. 1, an angle $\alpha$ is formed by a principal ray $O_I$ of laser beams entered the polygon mirror 50 and an optical axis $O_R$ of the imaging optical system 60 when they are projected on a main scanning plane. According to this embodiment, this angle $\alpha$ is set to, e.g., 5°.

As illustrated in FIG. 2, an angle $\delta$ is formed by the principal ray $O_I$ of laser beams entered the polygon mirror 50 and the optical axis $O_R$ of the imaging optical system 60 when they are projected on a cross-scanning plane. According to this embodiment, this angle $\delta$ is set to, e.g., 2°.

A description will be given with reference to FIG. 3 of the reason why the inclination a is made by the principal ray $O_I$ of laser beams entered the polygon mirror 50 and the optical axis $O_R$ of the imaging lens 61 on a main scanning cross-section, as illustrated in FIG. 1.

Figure 3:
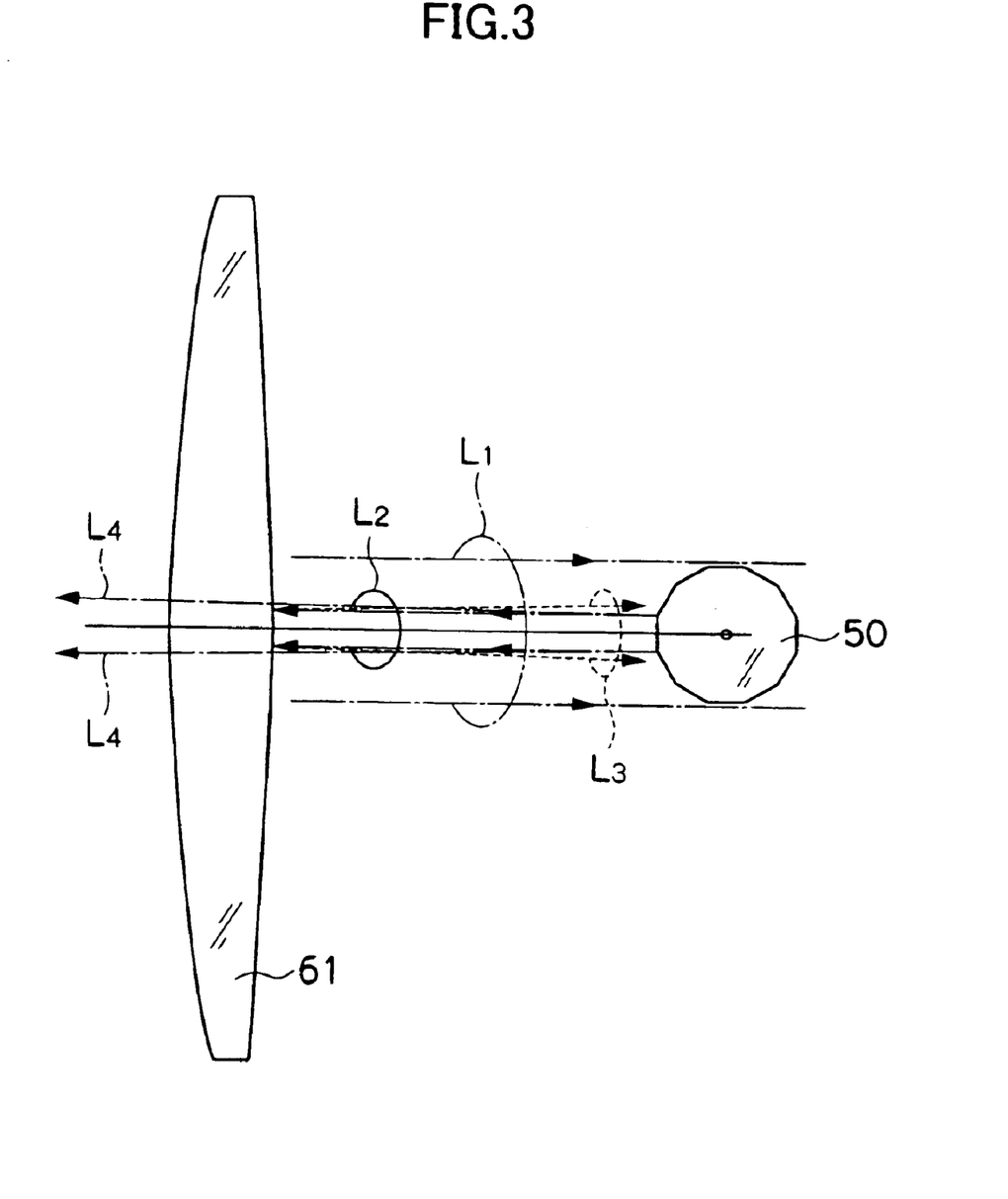
FIG. 3 is an explanatory view for explaining reflection of laser beams by an imaging lens.

FIG. 3 shows a view for explaining the reason why beams are entered the polygon mirror 50 with an angle, i.e., inclination.

As illustrated in FIG. 3, when beams are entered the polygon mirror 50 from a substantially frontal direction on the main scanning plane, the beams (L1) to be entered the polygon mirror 50 are reflected by the reflecting surfaces of the polygon mirror 50. The reflected beams (L2) pass through the imaging lens 61 to be applied to the photosensitive drum 23 (L4). At the same time, these beams are further reflected by the surface of the imaging lens 61 (L3).

The laser beams (L3) reflected by the imaging lens 61 are further reflected by the reflecting surfaces of the polygon mirror 50, and these reflected laser beams (i.e., reflected beams for L3) may enter an image area and deteriorate the same. In particular, when a coating for improving transmittance is not applied on the surface of the imaging lens 61, the influence of the reflected laser beams is substantial.

Accordingly, in order to avoid this problem, the inclination a is formed by the principal ray $O_I$ of beams entered the polygon mirror 50 and the optical axis $O_R$ of the imaging lens 61 on the main scanning cross-section.

Entering surface and exiting surface of the imaging lens 61 are of asymmetrical configurations. The imaging lens 61 has, with respect to the diameter of beams reflected by the polygon mirror 50, portions with larger positive power on scanning positions at scanning ends rather than on the central position of the scanning area in the main scanning direction. The imaging lens 61 is formed of a single lens.

The imaging lens 61 is made of, for example, acrylic resins (e.g., PMMA) and has a refractive index n of 1.483987 at 30° C. for laser beams with the wavelength of 780 nm. Further, the imaging lens 61 has a thickness of 24 mm in a de-focusing direction on the optical axis and a cross-scanning direction height of 25 mm.

The structure of the imaging lens 61 will be described hereinafter.

As illustrated in FIG. 1, when the inclination $\alpha$ is formed by the principal ray $O_I$ of beams entered the polygon mirror 50 and the optical axis $O_R$ of the imaging lens 61 on the main scanning cross-section, the main scanning direction diameters of beams reflected by the polygon mirror 50 vary depending on scanning angles.

Figure 4:
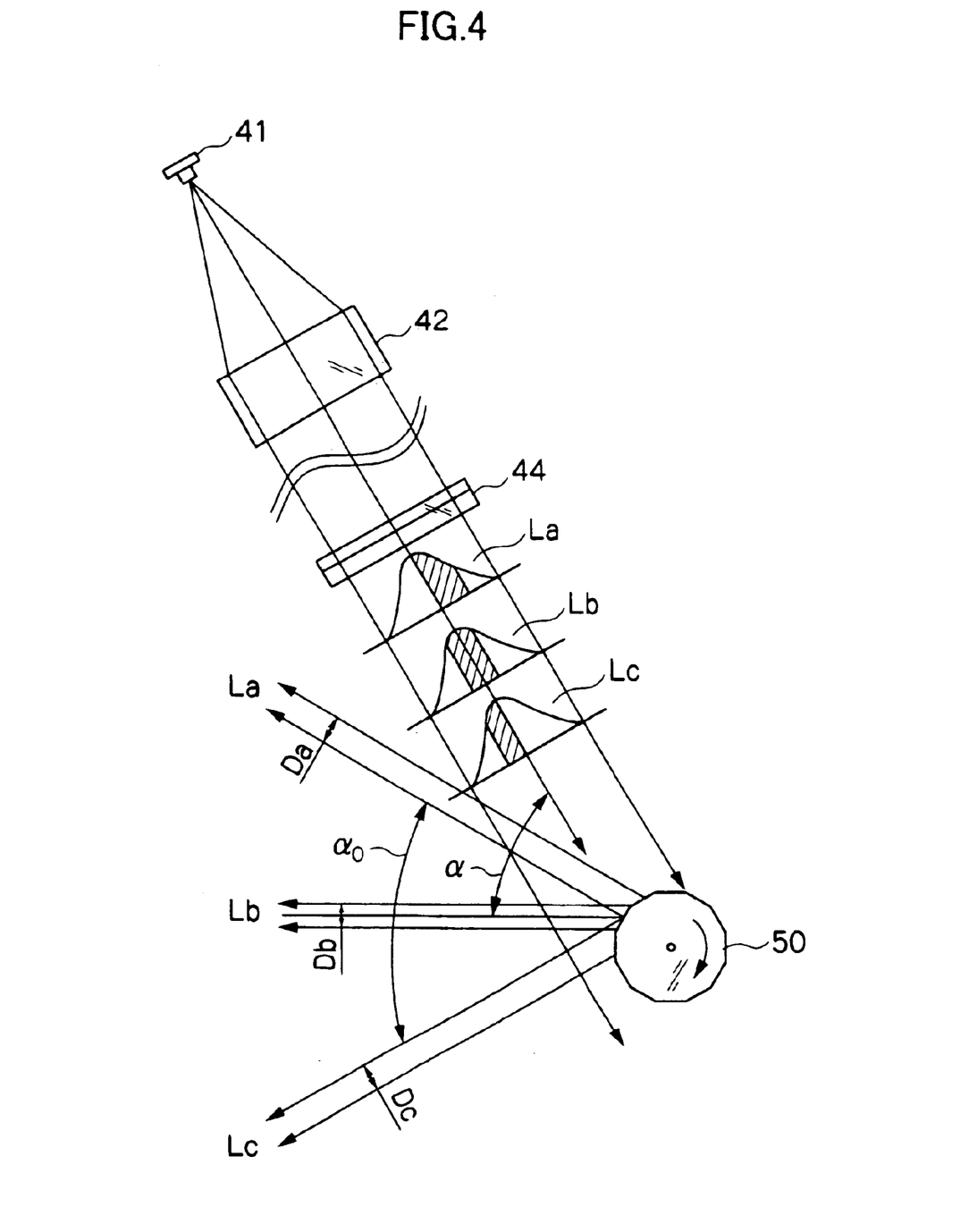
FIG. 4 is a principal explanatory view for explaining variations in diameters of beams reflected from a polygon mirror.

FIG. 4 shows a view for explaining that diameters of beams reflected by the polygon mirror 50 vary.

Referring to FIG. 4, suppose that the diameter of main scanning beam La at the start position of the entire scanning area is Da, the diameter of main scanning beam Lb at the central position of the entire scanning area is Db and the diameter of main scanning beam Lc at the end position of the entire scanning area is Dc. Then, the relationship Da>Db>Dc is established.

Then, suppose that diameters of the aforementioned main scanning beams on the photosensitive drum 23 are $\omega a$, $\omega b$ and $\omega c$, respectively. As the result, because these beam diameters are in proportion to F-number, the relationship $\omega a < \omega b < \omega c$ is established. Namely, the beam diameters vary and this may deteriorate images.

F-number is defined as f/D wherein f indicates a focal distance for the imaging optical system 60 and D indicates the main scanning direction diameter of reflected beam on the polygon mirror 50. F-number varies depending on the scanning angle $\alpha 0$.

The aforementioned beam diameter $\omega$ on the photosensitive drum 23 is generally represented as follows.

$$\omega \approx \lambda / (\pi \times \tan \theta) \tag{1}$$

wherein $\theta$ indicates a convergent angle on the photosensitive drum 23 and $\lambda$ indicates the wavelength of beam.

Accordingly, in order to reduce variations in the beam diameter on the photosensitive drum 23, variations in the convergent angle on the photosensitive drum 23 need to be reduced.

The imaging lens 61 has, in view of the above-described points, the following specific structures in order to reduce variations in the beam diameter on the photosensitive drum 23.

Figure 5A:
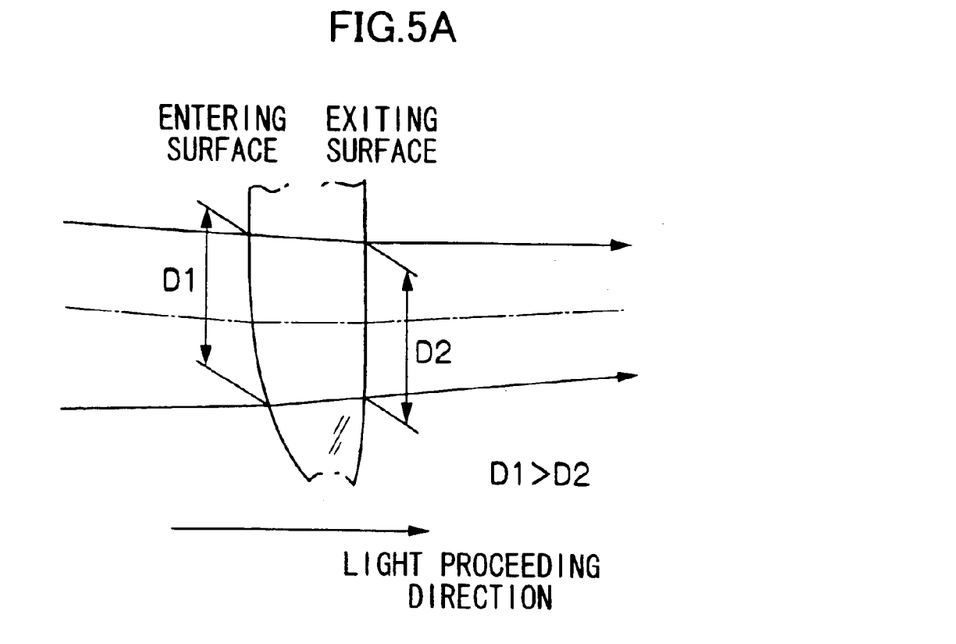
FIGS. 5A and 5B are explanatory views for explaining changes in the beam diameter in the cases of imaging lens with convex-shaped entering surface and of imaging lens with concave-shaped entering surface.
Figure 5B:
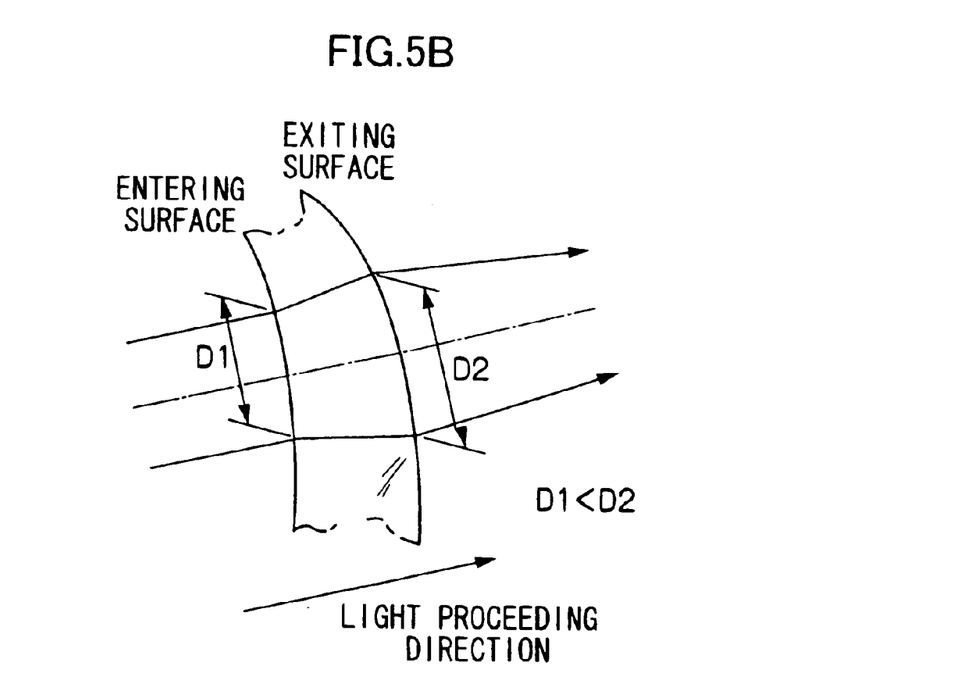

FIGS. 5A and 5B show views for explaining the surface configuration of the imaging lens 61 for reducing variations in the convergent angle and variations in the beam diameter over the entire scanning area.

FIG. 5A illustrates the case in which the entering surface of the imaging lens 61 in the main scanning direction is formed in a convex shape. An entering beam passes through the entering surface to be made into converging light. The diameter (D2) of the beam exited from the imaging lens 61 at the exiting position is smaller than that (D1) of the beam at the entering position. In this case, the convergent angle on the photosensitive drum 23 (image surface) is large and the diameter of main scanning beam is small.

Accordingly, this may be applied to the case in which the diameter of main scanning reflected beam on the polygon mirror 50 is large, i.e., to the case of small F-number. For example, this may be applied to the diameter Da of the main scanning beam La at the start position of the entire scanning area, as illustrated in FIG. 4.

When the above-described imaging lens 61 is provided to correct the beam at its exiting surface so that the focal position of the beam is in the vicinity of image surface (photosensitive drum 23), the convergent angle becomes smaller as compared to cases that the beam is not transmitted through the imaging lens 61.

FIG. 5B illustrates the case in which the entering surface of the imaging lens 61 in the main scanning direction is formed in a concave shape. A beam entering the imaging lens 61 is made into diverging light. The diameter (D2) of beam exited from the imaging lens 61 at the exiting position is larger than that (D1) of beam at the entering position.

Accordingly, when the above-described imaging lens 61 is provided to correct the beam at its exiting surface so that the focal position is on an image surface (photosensitive drum 23), the convergent angle becomes larger as compared to cases that the beam is not transmitted through the imaging lens 61.

FIG. 5B describes the case of the imaging lens 61 with the concave-shaped entering surface. Nevertheless, the same effects can be obtained even when the entering surface of the imaging lens 61 is formed in a convex shape or when the curvature of the imaging lens 61 is small.

As described above, in the case in which beams are made to enter the polygon mirror 50 in an inclined manner with respect to the main scanning cross-section in order to avoid deterioration of images caused by light reflected from the surface of the imaging lens 61, depending on scanning positions in the entire scanning area, the ratio of curvature of the entering surface of the imaging lens 61 to the exiting surface is changed so that the entering and exiting surfaces are of asymmetrical configurations. As a result, variations in the convergent angle of beams on the photosensitive drum 23 are reduced and the diameter of main scanning beams is made to be constant.

If an imaging lens with a symmetric configuration in the main scanning direction is provided, the convergent angle cannot be made to be constant. In order to correct the convergent angle, a plurality of optical components with power are required.

In view of above-described various points, for example, the following lens is provided for the imaging lens (fθ lens 61) of this embodiment.

For configurations of surfaces (entering surface and exiting surface) of the imaging lens 61, expression (2) is applied for defining such (non-spherical) lens surfaces. Parameter values for expression (2) are shown in Table 1.

[expression 1]

$$X = \frac{CUY * y^2 + CUZ * z^2}{1 + \sqrt{1 - AY * CUY^2 * y^2 - AZ * CUZ^2 * z^2}} + \sum_{n=0}\sum_{m=0} A_{mn} y^m z^{2n} \quad (2)$$

wherein y indicates the main scanning direction, z indicates the cross-scanning direction and x indicates the optical axis direction.

TABLE 1

| | Emitting surface | | | |
|---|---|---|---|---|
| CUY | CYZ | AY | AZ |
| −5.672E−03 | −4.660E−03 | 1 | 1 |

| | | III | | | | |
|---|---|---|---|---|---|---|
| | | 0 | 1 | 2 | 3 | 4 | 5 |
| n | 0 | 0.000E+00 | 2.787E−03 | 1.980E−03 | 1.335E−07 | 1.044E−07 | −2.786E−11 |
| | 1 | 4.553E−03 | 1.328E−06 | −2.476E−07 | 5.778E−10 | 9.129E−11 | −1.236E−14 |
| | 2 | 5.619E−06 | −7.489E−09 | −8.817E−10 | 1.685E−12 | −6.660E−14 | −5.188E−16 |

| | | III | | | | |
|---|---|---|---|---|---|---|
| | | 6 | 7 | 8 | 9 | 10 |
| n | 0 | −7.059E−12 | 3.692E−15 | 1.841E−16 | −6.741E−20 | −1.779E−20 |
| | 1 | −7.811E−15 | −2.800E−18 | 3.600E−19 | 6.332E−22 | 8.659E−24 |
| | 2 | 9.075E−18 | 1.148E−19 | 5.498E−21 | −5.670E−24 | −3.951E−25 |

TABLE 1-continued

| | Exiting surface | | |
|---|---|---|---|
| CUY | CYZ | AY | AZ |
| 5.092E−03 | 1.651E−02 | 1 | 1 |

| | | III | | | | |
|---|---|---|---|---|---|---|
| | | 0 | 1 | 2 | 3 | 4 | 5 |
| n | 0 | 0.000E+00 | −1.071E−03 | −8.388E−04 | 1.647E−07 | 5.067E−08 | −2.561E−11 |
| | 1 | 3.809E−03 | 9.143E−07 | −3.924E−07 | 5.036E−10 | 4.401E−11 | −2.248E−14 |
| | 2 | 2.945E−06 | −4.016E−09 | −1.720E−10 | 2.644E−13 | −3.675E−14 | −4.145E−17 |

| | | III | | | | |
|---|---|---|---|---|---|---|
| | | 6 | 7 | 8 | 9 | 10 |
| n | 0 | −4.086E−12 | 1.397E−15 | 1.539E−16 | 1.951E−19 | −4.158E−20 |
| | 1 | −5.812E−16 | 4.130E−18 | −1.228E−19 | 2.809E−22 | 9.314E−24 |
| | 2 | −1.222E−17 | 1.238E−20 | 3.609E−21 | 1.408E−24 | 7.214E−26 |

The imaging lens 61 defined by such expression and table is used and m for $y^m$ in the non-spherical term is set to include an odd number term. Thus, variations in F-number over the entire scanning area are corrected by the imaging lens 61 and the diameter of beams is made to be constant over the entire scanning area.

Figure 15:
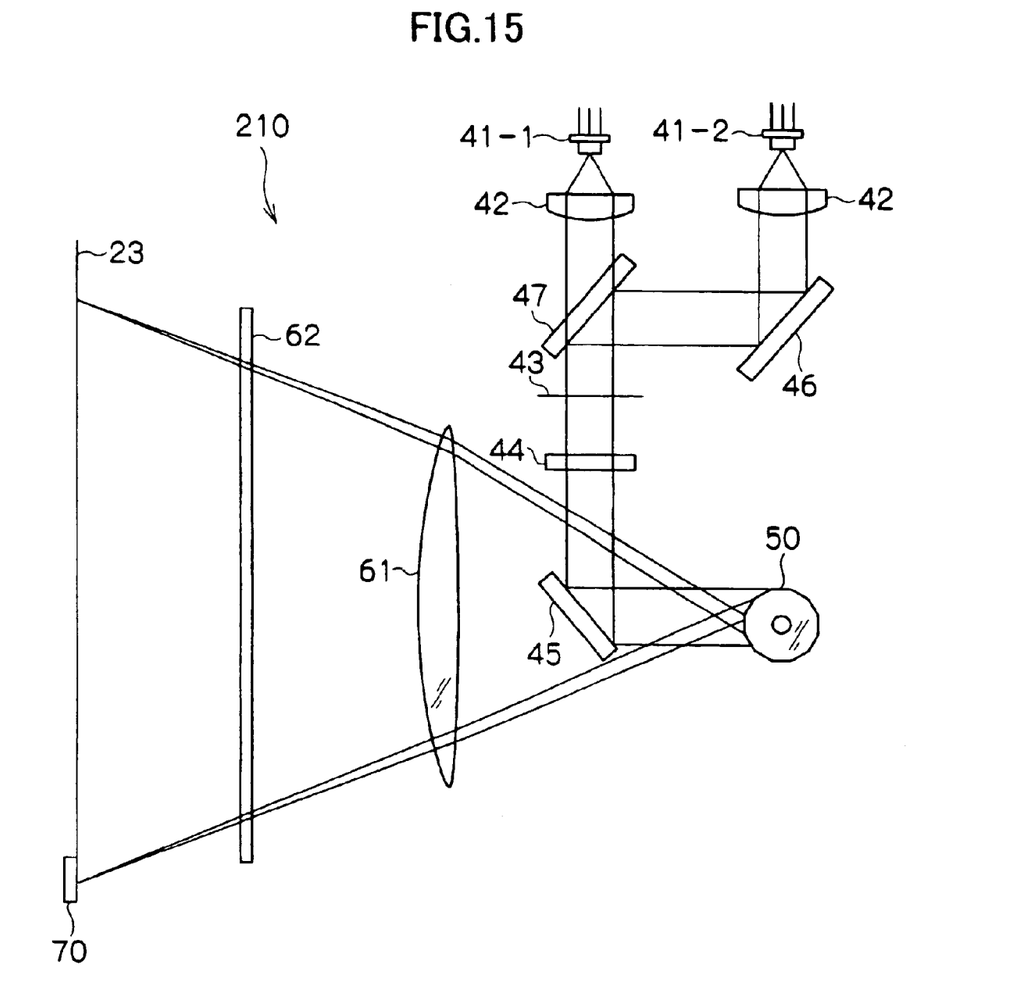
FIG. 15 is a schematic plan view illustrating the structure of an optical beam scanning device 210 seen from a main scanning direction.
Figure 16:
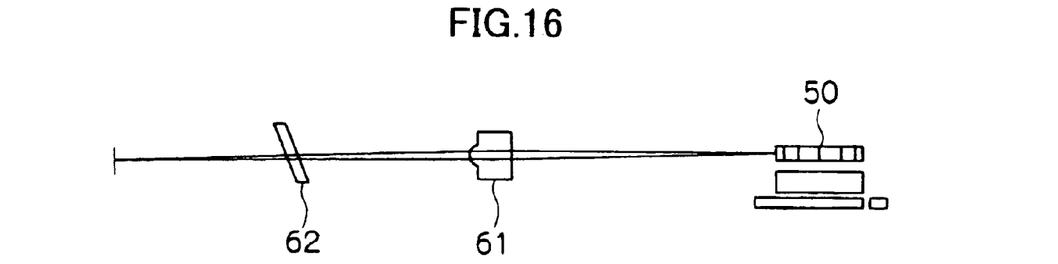
FIG. 16 is a schematic plan view illustrating the structure of the optical beam scanning device 210 seen from a cross-scanning direction.

In the case of multi-beam type optical beam scanning device 210 in which as illustrated in FIGS. 15 and 16, a plurality of laser beams from a plurality of (two in FIGS. 15 and 16) light sources 41-1 and 41-2 are made to enter the imaging lens 61, the surfaces of the imaging lens 61 are preferably defined by the following expression (3) in which the degree of z in the non-spherical term in expression (2) includes an odd number term.

[expression 2]

$$X = \frac{CUY*y^2 + CUZ*z^2}{1+\sqrt{1-AY*CUY^2*y^2-AZ*CUZ^2*z^2}} + \sum_{n=0}\sum_{m=0}A_{mn}y^m z^n \quad (3)$$

Structures of the optical beam scanning device 210 illustrated in FIGS. 15 and 16 which correspond to the structures of the optical beam scanning device illustrated in FIG. 1 are denoted by the corresponding reference numerals, and descriptions thereof will be omitted.

In addition to the structures of the optical beam scanning device 21 illustrated in FIG. 1, the optical beam scanning device 210 illustrated in FIGS. 15 and 16 has a beam position controlling actuator 46 (e.g., galvanomirror) and a combining device 47(e.g., half-mirror) in the pre-deflection optical system. The beam position controlling actuator 46 bends laser beams from the light source 41-2. The combining device 47 combines laser beams from the light source 41-1 with laser beams reflected by the beam position controlling actuator 46. The rays from the combining device 47 are emitted to the polygon mirror 50 by a plurality of lenses and mirrors disposed.

The rays scanned by the polygon mirror 50 are made to pass through an fθ lens. Then, the sensor detects an interval between the beams and the angle of the actuator (e.g., galvanomirror) 46 is changed, so that the interval between the beams is controlled so as to be a desired one. The actuator 46 may be of not a reflection type but a transmission type.

The polygon mirror 50 is formed in a regular dodecahedral shape with the diameter Dp of its inscribed circle being 29 mm. The width Wp of each surface of the polygon mirror 50 is generally represented as follows.

$$Wp=\tan(\pi/N)\times Dp \quad (4)$$

wherein N indicates the number of surfaces of the polygon mirror.

Accordingly, the width Wp of each surface of the polygon mirror 50 in this embodiment is calculated as follows.

$$Wp=\tan(\pi/12)\times 29=7.77 \text{ mm}$$

The main scanning direction width of beam entered the polygon mirror 50 is 32 mm. The width of incident beam is larger than the main scanning width of the reflecting surfaces for the polygon mirror 50.

In the case in which the photo sensitive drum 23 is scanned in the main scanning direction with reflected beams from the reflecting surfaces of the polygon mirror 50, the relationship between a main scanning direction scanning position on the photosensitive drum 23 and a scanning angle α0 will be described with reference to FIG. 14.

Figure 14:
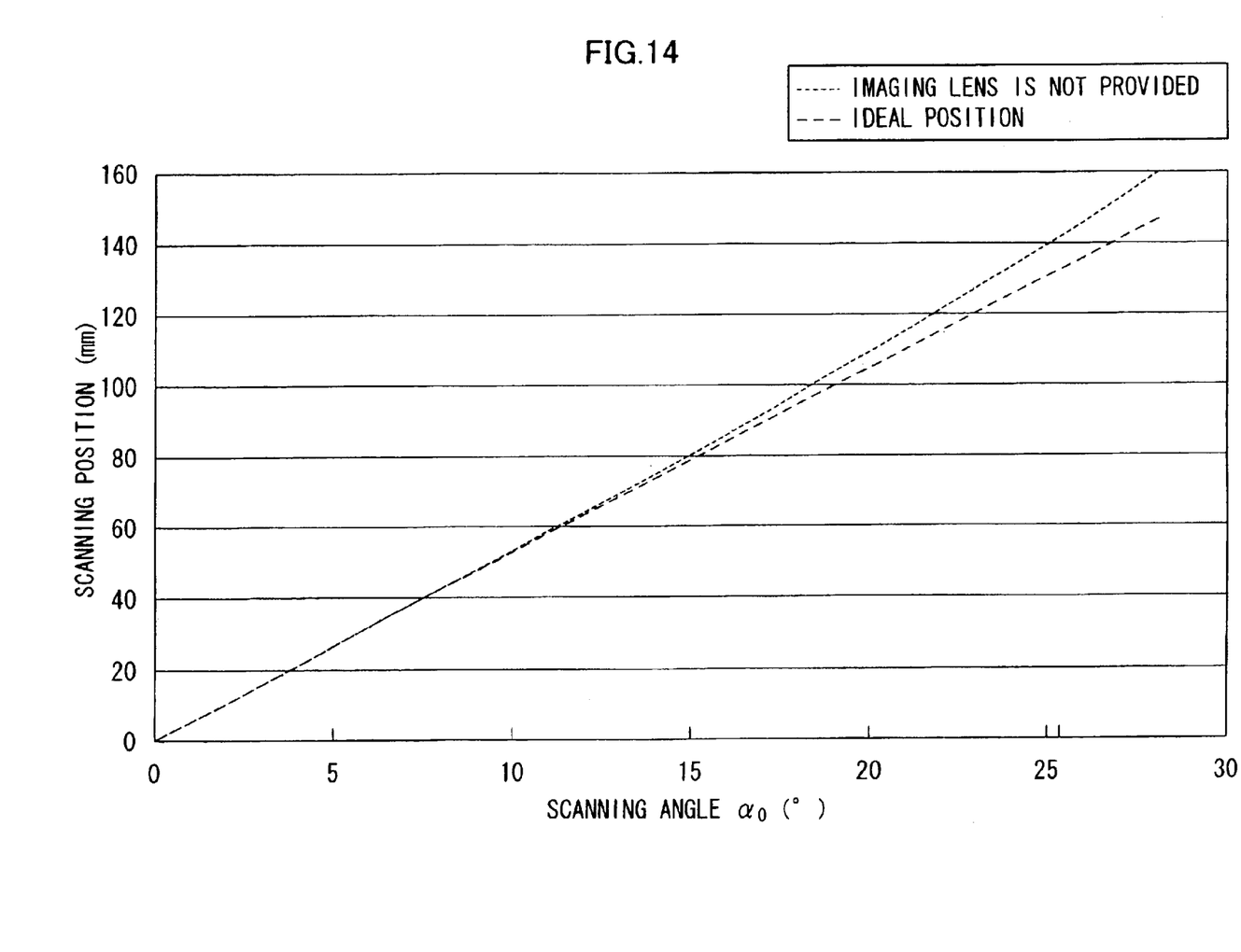
FIG. 14 is a graph in which the target position (ideal position) of the scanning position is compared to the case of scanning a photosensitive drum 23 without placing an imaging lens 61 between a polygon mirror 50 and the photosensitive drum 23.

Referring to FIG. 14, the case in which the photosensitive drum 23 is scanned without the imaging lens 61 being disposed between the polygon mirror 50 and the photosensitive drum 23 is compared to a target position (ideal position) of a scanning position. With respect to the scanning position in x-axis illustrated in FIG. 14, the central position in the entire scanning area is set to 0 mm.

The main scanning direction scanning position on the photosensitive drum 23 is generally in proportion to α0 which is the scanning angle of the polygon mirror 50.

When the photosensitive drum 23 is scanned with reflected beams without the imaging lens 61 being disposed, the scanning position is shifted greatly from the target position as the scanning angle α0 is increased.

Accordingly, if the scanning position is to be increased to some extent without the imaging lens 61 being disposed (e.g., 125 mm or more of the scanning position (250 mm or more of the entire scanning area) and 320 mm or more of the entire scanning area), the scanning angle α0 must be increased. The scanning area extends from the position where a beam enters the horizontal synchronizing sensor to the end of image forming area, which area includes a margin.

In particular, when an overfilled type optical beam scanning device is applied, the scanning angle is restricted. Accordingly, the ratio of angle at which the light source (e.g., laser diode) 41 actually emits to an available scanning angle must be increased (i.e., made to approximate 1).

The light source (e.g., laser diode) 41 requires a non-emitting area where the light source is not emitted by control of an unillustrated Auto Power Control from the end position of main scanning direction one line on the photosensitive drum 23 to the start position of the next line.

The APC generally utilizes a line APC. The line APC is a method for controlling the light source so as to have predetermined power by emitting the same for a certain period of time outside an image printing area. The line APC requires control time which is referred to as an APC period. Results of control during the period are maintained in a control result holding element (which is generally an electric charge holding element such as a capacitor). Shorter periods can deal with faster period of horizontal lines. When the capacity of a holding element is large, it takes a long time for initial charging (at the time of switching on a power source or returning from an abnormal state) and it is difficult to complete the control in one line. (The initial charging may be completed by using a plurality of lines. Alternatively, after the initial charging is once completed, the line APC may be continued. In this case, because influences of discharging due to being left are minimized, the control is completed during the APC period for one line.) When the capacity of the holding element is small, it takes shorter time for charging but the element is not suitable for storage for a long period of time (the droop phenomenon that discharging occurs gradually may take place.).

Accordingly, the APC period and the result holding capacitor need to be optimized so as to satisfy standards. In order to shorten the control period, the capacity of the control result holding capacitor is reduced. The capacity may be reduced to 1 $\mu$s in the system optimization.

In the case of setting the scanning position to 125 mm or more or defining 320 mm or more of the entire scanning area as described above, at a certain scanning angle $\alpha 0$, the scanning position when the imaging lens 61 is not disposed may exceed the ideal position. Thus, it is difficult to ensure the APC control time of the light source.

Accordingly, the polygon mirror 50 performs scanning at the scanning angle $\alpha 0$ to be described below which ensures the APC control time for the light source 41.

In order to obtain an excellent linearity (fθ characteristic) between the scanning angle and the scanning position, the imaging lens 61 must have positive power at scanning ends. When the imaging lens has the positive power at scanning ends, as illustrated in FIG. 5A, light is diffracted toward a scanning sensor and thus the scanning ends with larger positive power are required. When the number of lenses is reduced (e.g., when the number of lenses is one), the scanning angle must be increased. In the case of plastic lenses, the degree of freedom is provided for configurations of lens surfaces. Accordingly, while optical characteristics including fθ characteristic and uniformity of beam diameters are satisfied, the number of lenses is reduced and cost reduction is realized.

Time T in a non-emission area is calculated as follows.

$$T=\{(2\pi/N)-\alpha 0)\}/(2\pi/N)/(Vr/60\times N) \quad (5)$$

wherein $\alpha 0$ [rad] indicates the scanning angle for laser beam emission area ($\alpha 0$ is an angle including an image width, a range from the end of image area to the horizontal synchronizing sensor and a margin.), N indicates the number of surfaces of the polygon mirror 50 and Vr [r.p.m] indicates the number of revolutions of the polygon scanner.

Suppose that $1\times10^{-6}$[s] or longer of the APC control time is generally required, the following expression is derived.

$$T \geq 1\times 10^{-6} \quad (6)$$

By using expressions (5) and (6), the following expression is derived.

$$\alpha 0 \leq \pi\{(2/N)-(Vr/3)\times 10^{-7})\} \quad (7)$$

Figure 6:
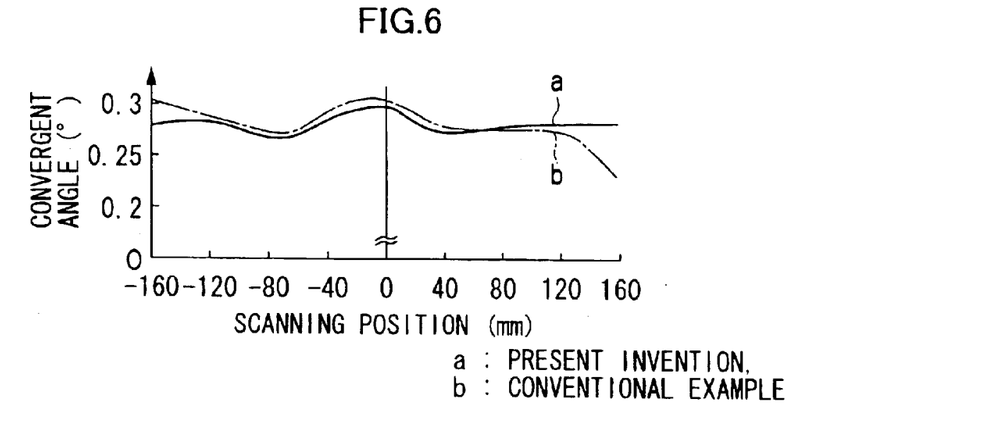
FIG. 6 is a graph illustrating the relationship between a scanning position and a convergent angle in the cases of an imaging lens with asymmetrical entering surface and exiting surface and of an imaging lens with symmetrical entering surface and exiting surface in the optical beam scanning device 21.

FIG. 6 shows a graph illustrating the relationship between the scanning position and the convergent angle when the optical beam scanning device 21 has the imaging lens 61 with asymmetrical entering and exiting surfaces and when the optical beam scanning device includes an imaging lens with symmetrical entering and exiting surfaces.

The alphabetical character a in FIG. 6 indicates the case of having the imaging lens with asymmetrical configuration and the alphabetical character b in FIG. 6 indicates the case of having the imaging lens with symmetrical configuration.

As illustrated in FIG. 6, the convergent angle is constant over a wide range of scanning positions in the case of having the imaging lens 61 with asymmetrical configuration as compared to the case of having the imaging lens with symmetrical configuration.

Figure 7:
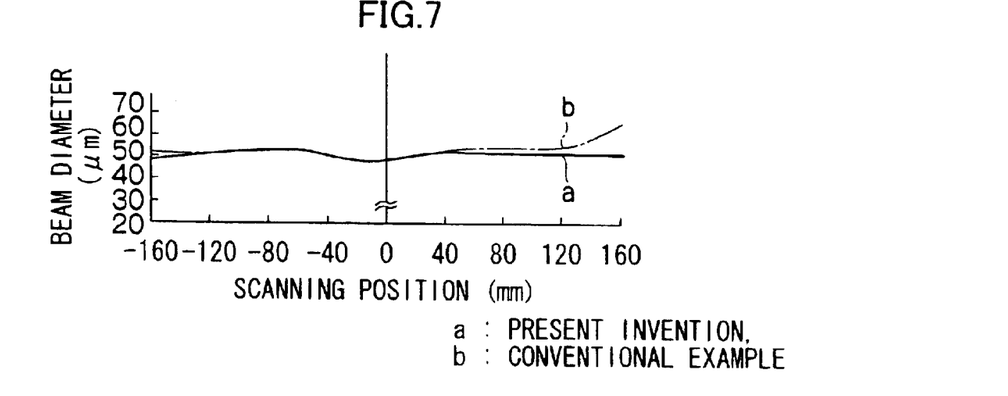
FIG. 7 is a graph illustrating the relationship between the scanning position and a laser beam diameter in the cases of the imaging lens with asymmetrical entering surface and exiting surface and of the imaging lens with symmetrical entering surface and exiting surface in the optical beam scanning device 21.

FIG. 7 shows a graph illustrating the relationship between the scanning position and the laser beam diameter when the optical beam scanning device 21 has the imaging lens 61 with asymmetrical entering and exiting surfaces and when the optical beam scanning device has an imaging lens with symmetrical entering and exiting surfaces.

The alphabetical character a in FIG. 7 indicates the case of having the imaging lens with asymmetrical configuration and the alphabetical character b in FIG. 7 indicates the case of having the imaging lens 61 with symmetrical configuration.

As illustrated in FIG. 7, the laser beam diameter is constant over a wide range of scanning positions in the case of having the imaging lens 61 with asymmetrical configuration as compared to the case of having the imaging lens with symmetrical configuration.

Figure 8:
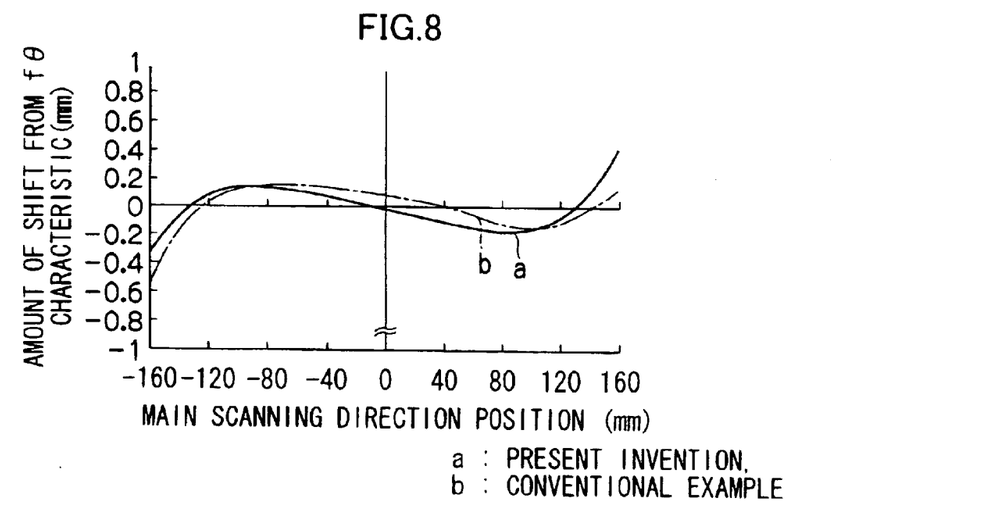
FIG. 8 is a graph illustrating an fθ characteristic in the cases of the imaging lens with asymmetrical entering surface and exiting surface and of the imaging lens with symmetrical entering surface and exiting surface in the optical beam scanning device 21.

FIG. 8 shows a graph illustrating the linearity (so-called fθ characteristic) of the rotating angle of a polygon mirror and the scanning position when the optical beam scanning device 21 has the imaging lens 61 with asymmetrical entering and exiting surfaces and when the optical beam scanning device has an imaging lens with symmetrical entering and exiting surfaces. Referring to FIG. 8, an x-axis indicates the amount by which a design value is shifted from the scanning position (target position) when the linearity is established between the rotating angle for a polygon mirror and the scanning position.

The alphabetical character a in FIG. 8 indicates the case of having the imaging lens 61 with asymmetrical configuration and the alphabetical character b in FIG. 8 indicates the case of having the imaging lens with symmetrical configuration.

As illustrated in FIG. 8, the curve in the case of having the imaging lens 61 with asymmetrical configuration is in excellent shape at various scanning positions as compared to the case of having the imaging lens with symmetrical configuration. Thus, the fθ characteristic is symmetrical and corrected in a well-balanced manner.

The optical component with asymmetrical configuration is not restricted to a lens. The same effects are obtained by optical components with power including a mirror surface.

A glass lens is preferable because it easily corrects characteristics because of its high refractive index and influences of moisture absorption and temperature changes are minimized.

Next, a description will be given of the case in which laser beams enter a polygon mirror from the outside of a scanning area with reference to FIGS. 9 and 10.

Figure 9:
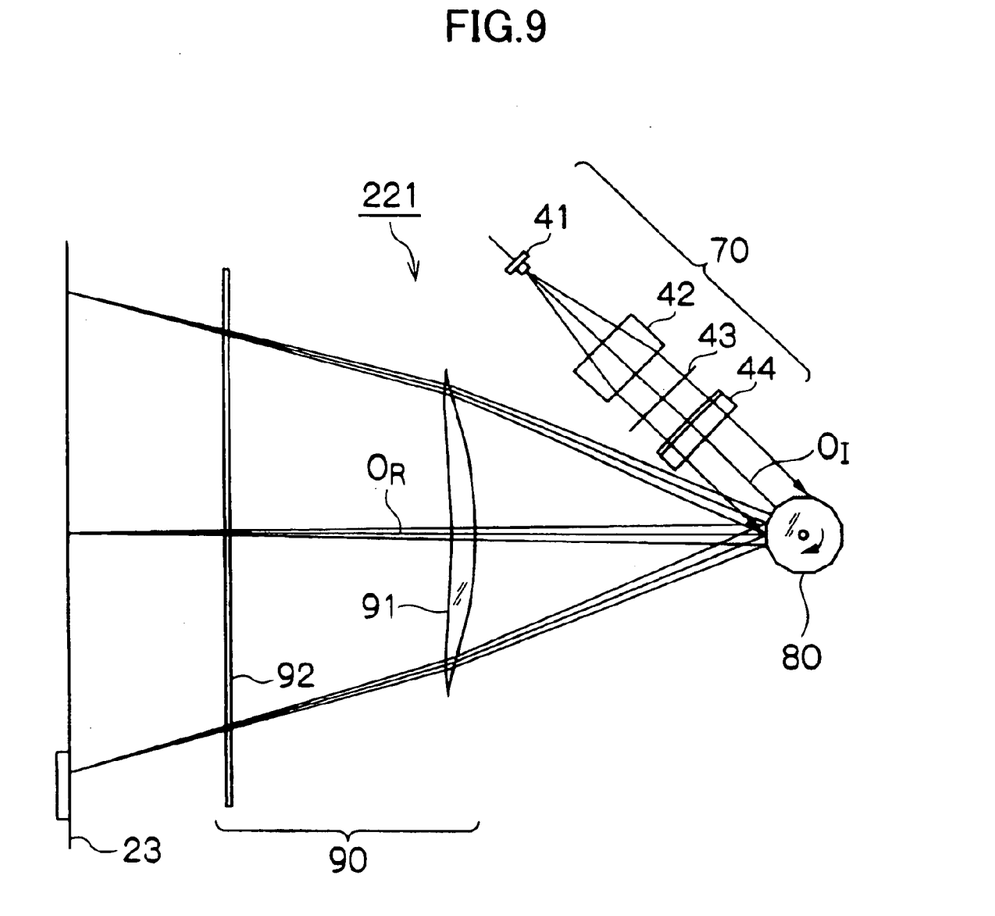
FIG. 9 is a schematic plan view illustrating the structure of an optical beam scanning device 221 seen from a main scanning direction.

FIG. 9 illustrates a schematic plane view of an optical beam scanning device 221 utilized in the case in which beams enter a polygon mirror from the outside of a scanning area, in which a main scanning direction is shown as a plane.

Figure 10:
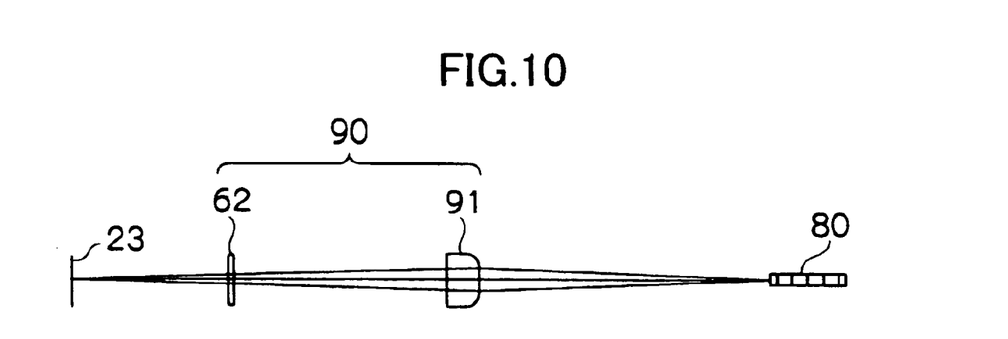
FIG. 10 is a schematic plan view illustrating the structure of the optical beam scanning device 221 seen from a cross-scanning direction.

FIG. 10 illustrates a schematic plane view in which a cross-scanning direction which is perpendicular to the main scanning direction shown in FIG. 9 is depicted as a plane.

The optical beam scanning device 221 illustrated in FIG. 9 has a pre-deflection optical system 70, a polygon mirror 80 and an imaging optical system 90. The pre-deflection optical system 70 of the optical beam scanning device 221 has a light source 41, a luminous flux converting lens 42, an aperture 43 and a cylindrical lens 44. These components correspond the respective structures described in FIG. 1.

According to the optical beam scanning device 221 illustrated in FIG. 9, an angle α formed by a principal ray $O_I$ of beams entered the polygon mirror 80 and an optical axis $O_R$ of the imaging optical system 90 when they are projected on a scanning plane is 46.42°. Referring to FIG. 10, an angle δ formed by a beam entered the polygon mirror 80 and the scanning plane is 0°.

Figure 11:
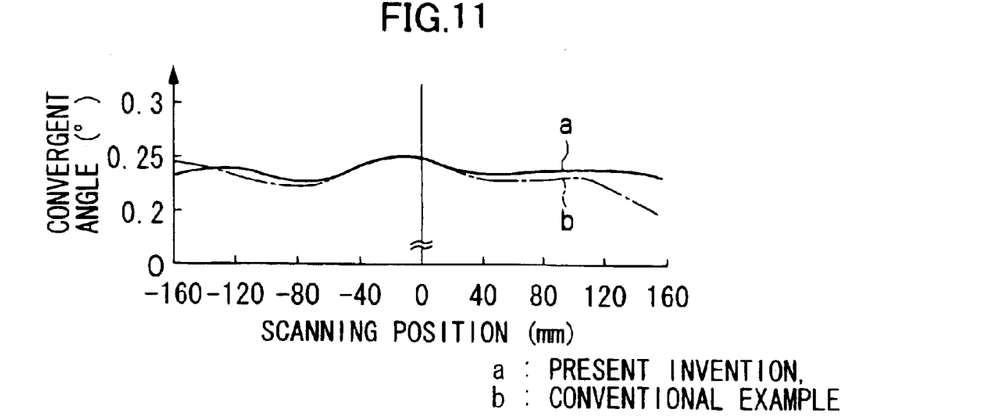
FIG. 11 is a graph illustrating the relationship between a scanning position and a convergent angle in the cases of an imaging lens with asymmetrical entering surface and exiting surface and of an imaging lens with symmetrical entering surface and exiting surface in the optical beam scanning device 221.

Configurations of entering and exiting surfaces of the imaging lens 91 are defined by expression (2) and figures are shown in Table 2.

when the optical beam scanning device has an imaging lens with symmetrical entering and exiting surfaces.

The alphabetical character a in FIG. 11 indicates the case of having the imaging lens with asymmetrical configuration and the alphabetical character b in FIG. 11 indicates the case of having the imaging lens 91 with symmetrical configuration.

As illustrated in FIG. 11, the convergent angle is constant over a wide range of scanning positions in the case of having the imaging lens 91 with asymmetrical configuration as compared to the case of including the imaging lens with symmetrical configuration.

Figure 12:
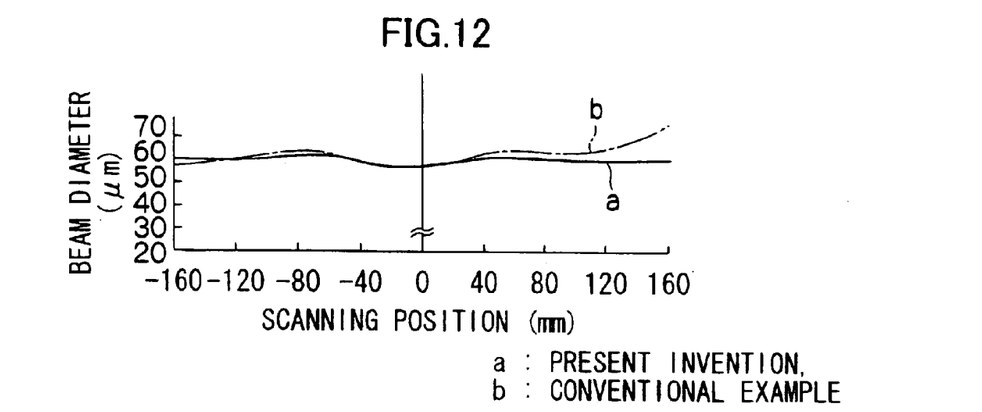
FIG. 12 is a graph illustrating the relationship between the scanning position and a laser beam diameter in the cases of the imaging lens with asymmetrical entering surface and exiting surface and of the imaging lens with symmetrical entering surface and exiting surface in the optical beam scanning device 221.

FIG. 12 shows a graph illustrating the relationship between the scanning position and the laser beam diameter when the optical beam scanning device 221 has the imaging lens 91 with asymmetrical entering and exiting surfaces and when the optical beam scanning device has an imaging lens with symmetrical entering and exiting surfaces.

The alphabetical character a in FIG. 12 indicates the case of having the imaging lens with asymmetrical configuration and the alphabetical character b in FIG. 12 indicates the case of having the imaging lens 91 with symmetrical configuration.

As illustrated in FIG. 12, the laser beam diameter is constant over a wide range of scanning positions in the case of having the imaging lens 91 with asymmetrical configuration as compared to the case of having the imaging lens with symmetrical configuration.

Figure 13:
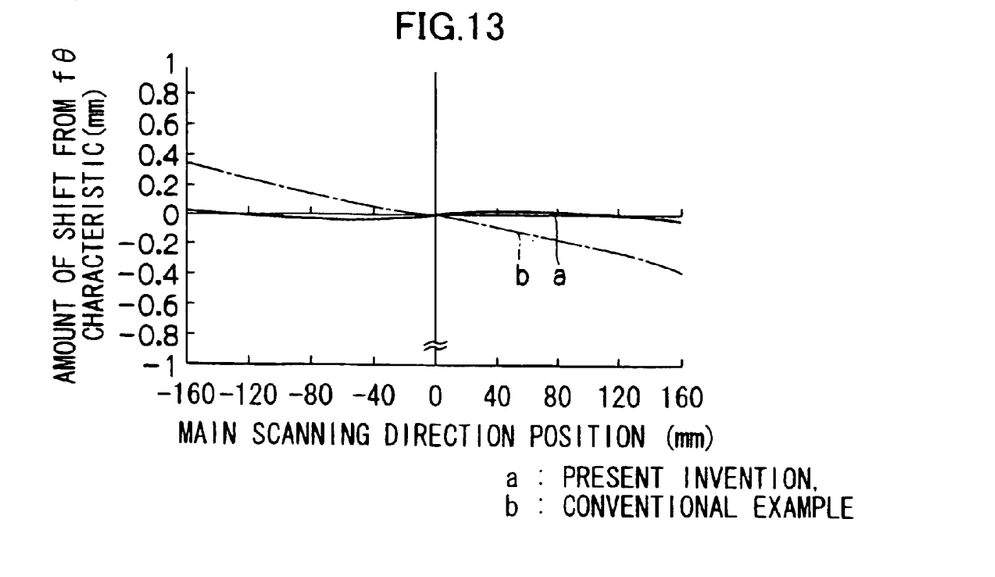
FIG. 13 is a graph illustrating an fθ characteristic in the cases of the imaging lens with asymmetrical entering surface and exiting surface and of the imaging lens with symmetrical entering surface and exiting surface in the optical beam scanning device 221.

FIG. 13 shows a graph illustrating the linearity (so-called fθ characteristic) of the rotating angle of a polygon mirror and the scanning position when the optical beam scanning

TABLE 2

| | | CUY | CYZ | AY | AZ | | | |
|---|---|---|---|---|---|---|---|---|
| | | | Entering surface | | | | | |
| | | −0.0047 | −0.0039 | 1 | 1 | | | |
| | | | | III | | | | |
| | 0 | 1 | 2 | 3 | 4 | 5 | 6 | 7 | 8 |
| n 0 | 0.00E+00 | −4.41E−03 | −2.71E−04 | 4.32E−07 | 1.17E−07 | −2.72E−11 | −1.52E−12 | 8.03E−16 | −2.34E−18 |
| 1 | 1.75E−02 | 1.62E−06 | −2.71E−06 | 3.57E−10 | 9.86E−11 | 1.56E−14 | 1.02E−15 | −1.55E−18 | 4.56E−20 |
| | | | Exiting surface | | | | | |
| | | CUY | CYZ | AY | AZ | | | |
| | | 0.0059 | −0.0036 | 1 | 1 | | | |
| | | | | III | | | | |
| | 0 | 1 | 2 | 3 | 4 | 5 | 6 | 7 | 8 |
| n 0 | 0.00E+00 | 5.70E−03 | −4.30E−03 | 4.60E−07 | 7.22E−08 | −1.58E−11 | −7.62E−13 | 5.08E−16 | −4.76E−17 |
| 1 | 2.44E−02 | 3.38E−06 | −1.69E−06 | −3.36E−12 | −7.89E−12 | 8.52E−15 | 1.07E−15 | 1.55E−18 | 2.88E−19 |

The imaging lens 91 is made of acrylic resins (e.g., PMMA) and has a refractive index n of 1.483987. The defocusing direction thickness of the imaging lens 91 is 15 mm on the optical axis. The polygon mirror 80 is formed in a regular dodecahedral shape with a circle with a diameter of 25 mm being inscribed therein.

FIG. 11 shows a graph illustrating the relationship between the scanning position and the convergent angle when the optical beam scanning device 221 has the imaging lens 91 with asymmetrical entering and exiting surfaces and device 221 has the imaging lens 91 with asymmetrical entering and exiting surfaces and when the optical beam scanning device has an imaging lens with symmetrical entering and exiting surfaces. Referring to FIG. 13, an x-axis indicates the amount by which a design value is shifted from the scanning position (target position) when the linearity is established between the rotating angle for a polygon mirror and the scanning position.

The alphabetical character a in FIG. 13 indicates the case of having the imaging lens 91 with asymmetrical configuration and the alphabetical character b in FIG. 13 indicates the case of having the imaging lens with symmetrical configuration.

As illustrated in FIG. 13, the curve in the case of having the imaging lens 91 with asymmetrical configuration is in excellent shape at various scanning positions as compared to the case of having the imaging lens with symmetrical configuration. Thus, the fθ characteristic is symmetrical and corrected in a well-balanced manner.

With respect to the configuration of the imaging lens 91 illustrated in FIG. 9, a coefficient is set to 0 when m in expression (2) is an odd number. Then, the imaging lens 91 is shifted in the main scanning direction by 0.32 mm. As a result, variations in the laser beam diameter are reduced and excellent optical characteristics including the fθ characteristic are obtained.

As described above, effects are obtained by shifting the optical component with power in the main scanning direction. Further, the same effects are obtained by making only one of the surfaces of the imaging lens 91 be eccentric.

With respect to the configuration of the imaging lens 91 illustrated in FIG. 9, the coefficient is set to 0 when m in expression (2) is an odd number. Then, the imaging lens 91 is inclined by 0.23° about the cross-scanning axis. As a result, variations in the laser beam diameter are reduced and excellent optical characteristics including the fθ characteristic are obtained.

As described above, effects are obtained only by rotating the optical component having power about the cross-scanning axis. The same effects are obtained only by rotating one of the surfaces of the imaging lens 91.

Superior effects are obtained by rotating only one of the surfaces of the imaging lens 91 and making the same be decentrated. Further superior effects are obtained by rotating the optical component about the main scanning axis and the optical axis as well as the cross-scanning axis.

(B) Second Embodiment

Next, a description will be given, with reference to FIG. 17, of a modified example of imaging elements placed in the above-described imaging optical system.

In the first embodiment, the case of using the imaging lens has been described. In a second embodiment, a description will be given of a case of including a first mirror 191 for reflecting laser beams reflected by the reflecting surfaces of the polygon mirror 50 and a second mirror 192 for reflecting the laser beams from the first mirror 191 to image them onto the photosensitive drum 23.

Figure 17A:
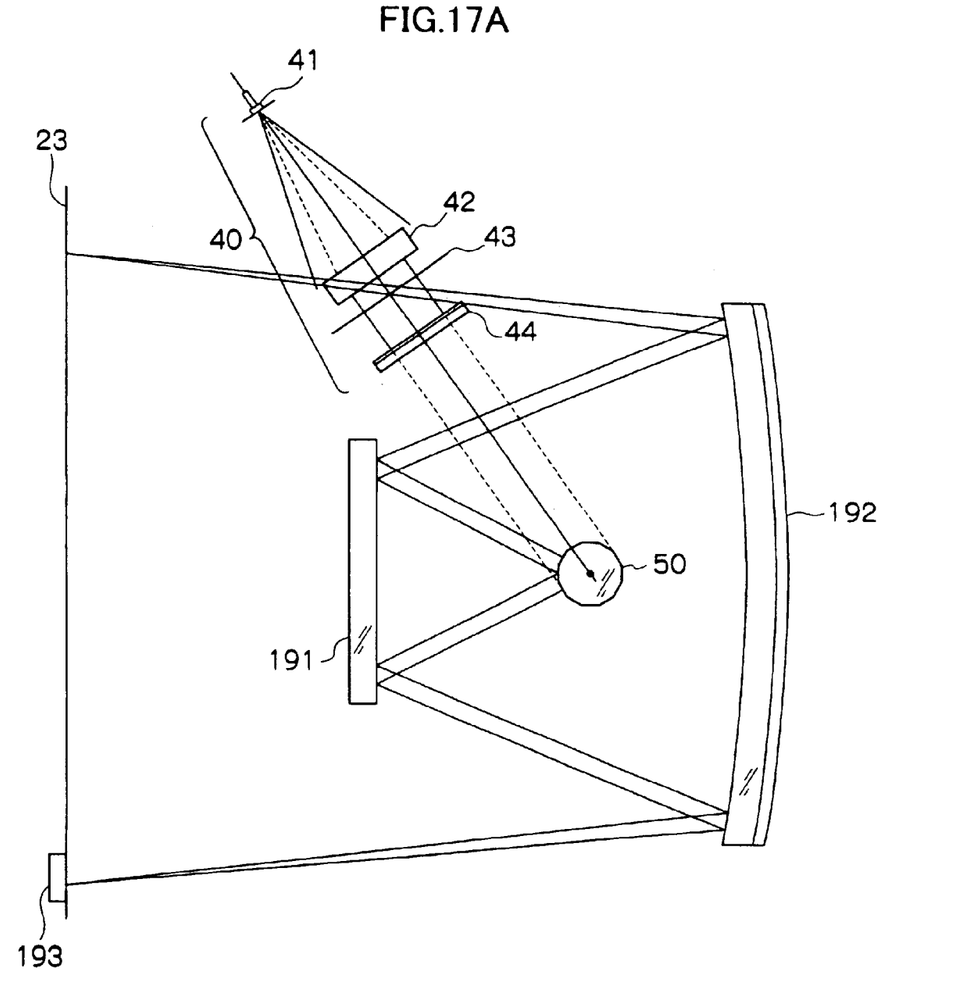
FIGS. 17A and 17B are structural views of an optical beam scanning device relating to a second embodiment.
Figure 17B:
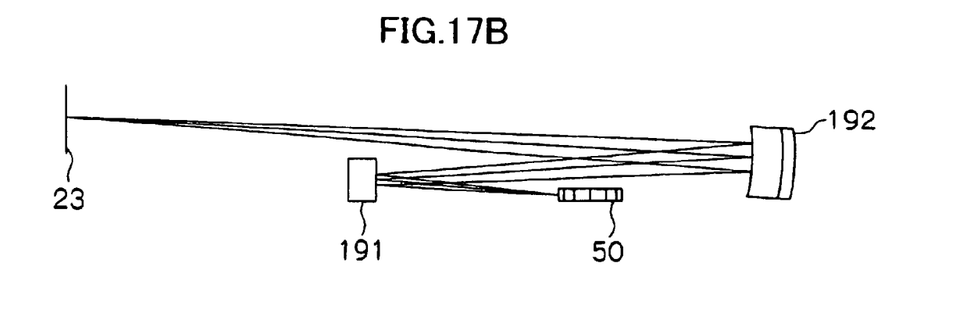

Referring to FIG. 17, a laser beam reflected by any reflecting surface of the polygon mirror 50 is applied to a divergent property in the cross-scanning direction by the first mirror 191. Further, the laser beam is applied to a convergent property in the main scanning direction by the second mirror 192. Then, the resultant beam is imaged substantially linearly onto a predetermined position of the photosensitive drum 23.

A horizontal synchronizing sensor 193 is provided, in the main scanning direction, at the "+" side (upstream side) with a scanning position with large variations in a beam diameter being the center. The horizontal synchronizing sensor (start position detecting sensor) 193 illustrated in FIG. 17A is placed at the position with small F-number, i.e., further toward the "+" side than the center of the scanning position (at the end portion of the side with larger cross-sectional diameter of laser beam of scanning ends on the photosensitive drum 23 in a first direction (i.e., at the upstream side)).

As a result, variations in the cross-sectional diameter of beam on images are reduced. (The influences of variations in the beam diameter are prevented from being made to appear on images by assigning the area of scanning positions with varied beam diameters to the horizontal synchronizing sensor.) Because a laser beam L with large diameter enters the horizontal synchronizing sensor 193, drawbacks that horizontal synchronization is not detected are eliminated.

In other words, the horizontal synchronizing sensor 193 is placed at the position which satisfies α≠0 wherein α indicates an angle formed by the principal ray of light entered the reflecting surfaces of the polygon mirror 50 and the optical axis of the second mirror 192 when they are projected on a scanning plane.

The laser beam L enters the horizontal synchronizing sensor 193 while maintaining its predetermined convergent property provided by the second mirror 192. Namely, the laser beam from the second mirror 192 to be directed to the photosensitive drum is guided to the horizontal synchronizing sensor 193 without being applied to special imaging characteristics.

As apparent from FIG. 17A, laser beams are scanned by the second mirror 192 over a main scanning direction scanning width of −160 mm to 160 mm on the photosensitive drum.

The configuration of reflecting surface of the first mirror 191 is defines as follows.

[expression 3]

$$X = \frac{CUY * y^2}{1 + \sqrt{1 - AY * CUY^2 * y^2 - AZ * CUZ^2 * z^2}} + \sum_{n=0}\sum_{m=0} A_{mn} y^m z^n \quad (8)$$

wherein CUY indicates a free-form function, y indicates a main scanning direction position, AY indicates a coefficient, CUZ indicates a free-form function, z indicates a cross-scanning direction position, AZ indicates a coefficient and Amn indicates a coefficient.

The main scanning direction power of the first mirror 191 is negative (formed in a convex shape). The main scanning direction power of the second mirror 192 is positive (formed in a concave shape). The second mirror 192 is also defined by the same expression.

In the optical beam scanning device illustrated in FIG. 17 which is formed by two mirrors, the horizontal synchronizing sensor 193 is placed at the position with small F-number, i.e., further toward the "+" side (upstream side) than the center of the scanning position, so that variations in the beam diameter on an image area are reduced (it is possible to prevent influences of variations in the beam diameter from being made to appear on images by assigning the area of scanning positions with varied beam diameters to the horizontal synchronizing sensor). Because the laser beam L with large diameter enters the horizontal synchronizing sensor 193, drawbacks that horizontal synchronization is not detected are eliminated.

As described above, in accordance with the present invention, variations in a main scanning direction beam diameter depending on scanning positions are reduced while ensuring APC control time for light source device. Further, high image quality is realized.

What is claimed is:

1. An optical beam scanning device comprising:

optical beam scanning means for rotational polygonal mirror to deflect entering luminous flux and scan an object to be scanned with the luminous flux;

pre-deflection optical system which shapes a luminous flux emitted from light source means so that the optical beam scanning means images the resultant luminous flux as a long line image in a direction corresponding to a main scanning direction; and imaging optical system which images the luminous flux scanned by the optical beam scanning means onto the object to be scanned, wherein the imaging optical system comprises an imaging optical element that in the entire main scanning area for luminous flux to be scanned by the optical beam scanning means, the central scanning position has a main scanning direction curvature different from that of the scanning end, and a scanning angle $\alpha 0$ [rad] at which the optical beam scanning means scans the object to be scanned with the luminous flux is defined by the following expression, $$\alpha 0 \leq \pi\{(2/N) - (Vr/3) \times 10^{-7}\}$$

wherein N indicates the number of surfaces of the rotational polygonal mirror and Vr [r.p.m.] indicates the revolution of the rotational polygonal mirror.

2. The optical beam scanning device according to claim 1, wherein the imaging optical element is formed so that at least one of its entering surface and exiting surface of at least one lens is of asymmetrical configuration, and in the entire main scanning area for the luminous flux scanned by the optical beam scanning means, the scanning position of the scanning end has larger power than that of the scanning central position.

3. The optical beam scanning device according to claim 2, wherein the imaging optical element is a lens.

4. The optical beam scanning device according to claim 2, wherein at least one of the imaging optical element is made of plastics.

5. The optical beam scanning device according to claim 2, wherein all of the imaging optical element is made of plastics.

6. The optical beam scanning device according to claim 5, wherein the imaging optical element is a single element.

7. An optical beam scanning device comprising:

optical beam scanning means for rotational polygonal mirror to deflect entering luminous flux and scan an object to be scanned with the luminous flux;

pre-deflection optical system which shapes a luminous flux emitted from light source means so that the optical beam scanning means images the resultant luminous flux as a long line image in a direction corresponding to a main scanning direction; and imaging optical system for imaging the luminous flux scanned by the optical beam scanning means onto the object to be scanned, in which the width of the luminous flux entering the optical beam scanning means is wider than the main scanning direction width of one of the reflecting surfaces of the rotational polygonal mirror, wherein the imaging optical system comprises an imaging optical element that in the entire main scanning area for luminous flux to be scanned by the optical beam scanning means, the central scanning position has a main scanning direction curvature different from that of the scanning position of the scanning end, and a scanning angle $\alpha 0$ [rad] at which the optical beam scanning means scans the object to be scanned with the luminous flux is defined by the following expression, $$\alpha 0 \leq \pi\{(2/N) - (Vr/3) \times 10^{-7}\}$$

wherein N indicates the number of surfaces of the rotational polygonal mirror and Vr [r.p.m.] indicates the revolution of the rotational polygonal mirror.

8. The optical beam scanning device according to claim 7, wherein the imaging optical element is a lens.

9. The optical beam scanning device according to claim 8, wherein all of the imaging optical element is made of plastics.

10. The optical beam scanning device according to claim 9, wherein the imaging optical element is a single element.

11. The optical beam scanning device according to claim 5, wherein the single imaging optical element is formed so that at least one of its entering surface and exiting surface is of asymmetrical configuration, and in the entire main scanning area for the luminous flux scanned by the optical beam scanning means, the scanning position of the scanning end has larger power than that of the scanning central position.

12. The optical beam scanning device according to claim 11, wherein the imaging optical element is a lens.

13. The optical beam scanning device according to claim 11, wherein at least one of the imaging optical element is made of plastics.

14. The optical beam scanning device according to claim 11, wherein all of the imaging optical element is made of plastics.

15. The optical beam scanning device according to claim 11, wherein the imaging optical element is a single element.

16. The optical beam scanning device according to claim 11, wherein the single imaging optical element is made of plastics.

* * * * *